Sept. 19, 1950 M. J. BERLYN ET AL Re. 23,268

FUEL SUPPLY APPARATUS FOR INTERNAL-COMBUSTION ENGINES

Original Filed April 5, 1946 4 Sheets-Sheet 1

INVENTORS.
MARTIN J. BERLYN
JOHN J. BRODERICK
BY
Raymond A. Paquin
ATTORNEY.

FUEL SUPPLY APPARATUS FOR INTERNAL-COMBUSTION ENGINES

Original Filed April 5, 1946 4 Sheets-Sheet 2

INVENTORS.
MARTIN J. BERLYN
JOHN J. BRODERICK
BY Raymond A. Paquin
ATTORNEY.

FUEL SUPPLY APPARATUS FOR INTERNAL-COMBUSTION ENGINES

Original Filed April 5, 1946 4 Sheets-Sheet 3

INVENTORS.
MARTIN J. BERLYN
JOHN J. BRODERICK
BY Raymond A. Paquin
ATTORNEY.

FUEL SUPPLY APPARATUS FOR INTERNAL-COMBUSTION ENGINES

Original Filed April 5, 1946 4 Sheets-Sheet 4

INVENTORS.
MARTIN J. BERLYN
JOHN J. BRODERICK
BY Raymond A. Paquin
ATTORNEY.

Reissued Sept. 19, 1950

Re. 23,268

UNITED STATES PATENT OFFICE 23,268

FUEL SUPPLY APPARATUS FOR INTERNAL-COMBUSTION ENGINES

Martin J. Berlyn, Suffield, Conn., and John J. Broderick, Springfield, Mass., assignors to American Bosch Corporation, Springfield, Mass., a corporation of New York Original No. 2,465,784, dated March 29, 1949, Serial No. 659,708, April 5, 1946. Application for reissue June 9, 1950, Serial No. 167,166

24 Claims. (Cl. 123—140)

Matter enclosed in heavy brackets [ ] appears in the original patent but forms no part of this reissue specification; matter printed in italics indicates the additions made by reissue

This invention relates to new and improved means for supplying fuel to the cylinders of an internal combustion engine and has particular reference to the provision of such apparatus which is relatively small, compact and economical in construction yet efficient in operation.

The principal object of the invention is to provide fuel supplying apparatus for small, high speed Diesel engines, or the like, which apparatus is relatively small, compact and economical in cost yet satisfactory in operation and which will incorporate features which make possible the utilizing of less costly drive and mounting means.

Another object of the invention is to provide a relatively small, compact and economical fuel supply unit which contains the fuel supply pump, injection pump and governor in a single unit and wherein the injection pump head, supply pump or governor may be separately removed for service or replacement without removing the unit from the engine.

Another object of the invention is to provide a fuel injection pump which is designed to operate at crankshaft speed when used with four stroke cycle engines, instead of operating at one-half crankshaft speed as is usual with prior constructions, and thereby allows the use of a pump driving pinion of one-half the usual pitch diameter and consequently reduces the size of said pinion to a point where it may be withdrawn through the pilot for the mounting flange for the pump to the engine drive gear housing and also allows the pump pinion to be mounted directly on the pump shaft and in many installations this amounts to the elimination of two bearings, a seal and a coupling.

Another object of the invention is to provide a fuel injecton pump which employs a pump drive pinion of relatively small diameter and therefore allows a reduction in the size of the laterally protruding pump drive gear housing and allows the making of the whole engine narrower than previously possible and which feature is especially desirable for engines for agricultural tractors.

Another object of the invention is to provide a new and improved fuel injection pump wherein the number of components requiring exceedingly fine workmanship such as lapped fits, accurately calibrated discharge check valves and ground metering edges have been reduced to a minimum.

Another object of the invention is to provide a fuel injection pump which avoids features unusually difficult to manufacture and features prone to functional trouble, such as, concentric lapped fits and plungers having axial holes and which are subjected to high fluid pressure which has been found to cause increase of diameter of the plunger and thereby cause binding of the plunger in its cylinder due to the inflation of the plunger with fluid pressure.

Another object of the invention is to provide a fuel injection pump which is designed to have natural inherent stable delivery characteristics, that is, the tendency to deliver a lower volume of fuel per stroke as the speed of operation is increased.

Another object of the invention is to provide a fuel injection pump which assists the operation of the governor therefor instead of opposing the action of the governor as in usual constructions and thereby makes possible the obtaining of satisfactory results with a relatively simple and economical governor.

Another object of the invention is to provide a device of the character described wherein it is practicable to mount the governor directly on the pump drive shaft thus eliminating the necessity for speed increasing gearing which is both expensive and bulky.

Another object of the invention is to provide an arrangement of the type set forth wherein it is possible to drive the fuel supply pump from the distributor gear of the fuel injection pump and thereby eliminating the necessity of special gearing.

Another object of the invention is to provide a fuel injection pump of the single plunger type which utilizes the same delivery valve and metering means for all outlets and, therefore, provides precise equal distribution to each of the pump outlets to the spray nozzles. In this connection it is well known that single plunger pumps using distributing means to direct successive pump discharges to various spray nozzles, if not provided with discharge check valve means, are inherently instable and do not give a tolerable degree of accuracy of distribution as between the various outlets and the introduction of delivery check valves in each of the outlets is one way of improving the accuracy of distribution, but the discharge check valves themselves have such a marked influence on the delivery characteristics that minute differences in the dimensions of the various check valves used in the pump can impart individual differences to the delivery characteristics of the various outlets and, therefore, an important object of the present invention is the utilization of a single discharge check valve serving all of the pump outlets and with said discharge check valve located between the pumping element and the distributing element.

Another object of the invention is to provide a fuel injection pump of the type set forth wherein the metering device is a throttled intake to the pump, and which has no relief port or spilling function which causes the pump to be much less sensitive to fuel supply pressure.

Another object of the invention is to provide a fuel injection pump that may be readily applied for operation in either direction of rotation and which may be readily executed for application to the left or right hand side of the engine.

Another object of the invention is to provide a new and improved fuel injection pump which will not pump fuel if operated in a reverse direction, thereby overcoming a drawback and cause of difficulty with prior constructions.

Other objects and advantages of the invention will be apparent from the following description taken in connection with the accompanying drawings. It will be understood that many changes may be made in the details of construction and arrangement of parts shown and described, as the preferred form has been shown by way of illustration only.

Referring to the drawings.

Figure 1:
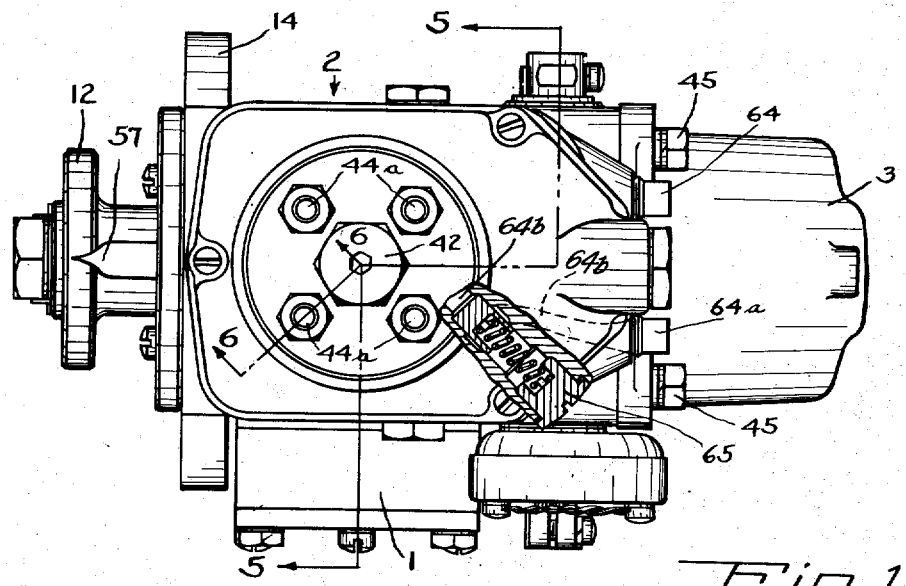
Fig. 1 is a top or plan view of a device embodying the invention.
Figure 5:
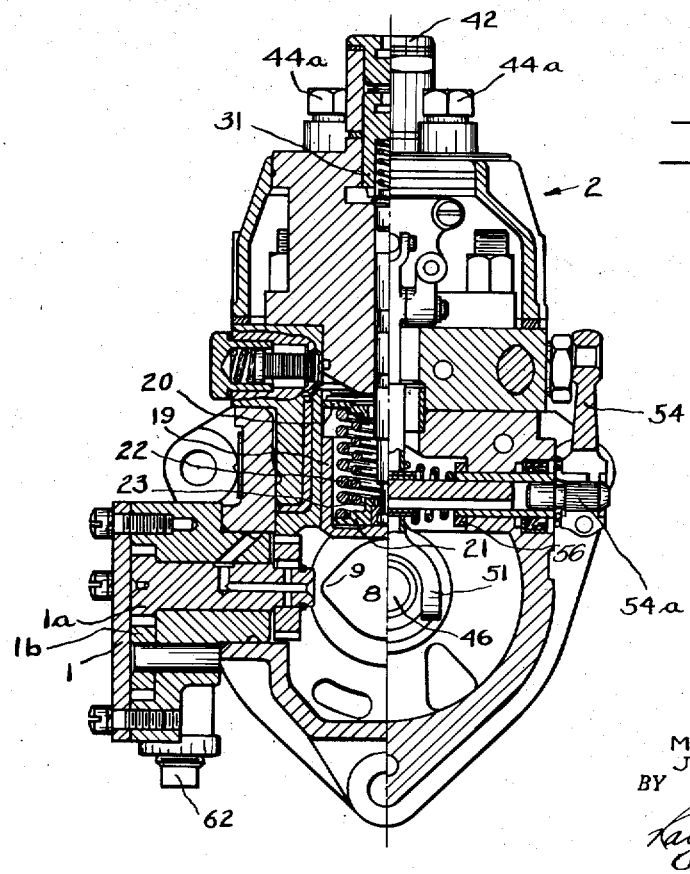
Fig. 5 is a sectional view taken on line 5—5 of Fig. 1 looking in the direction of the arrows.
Figure 2:
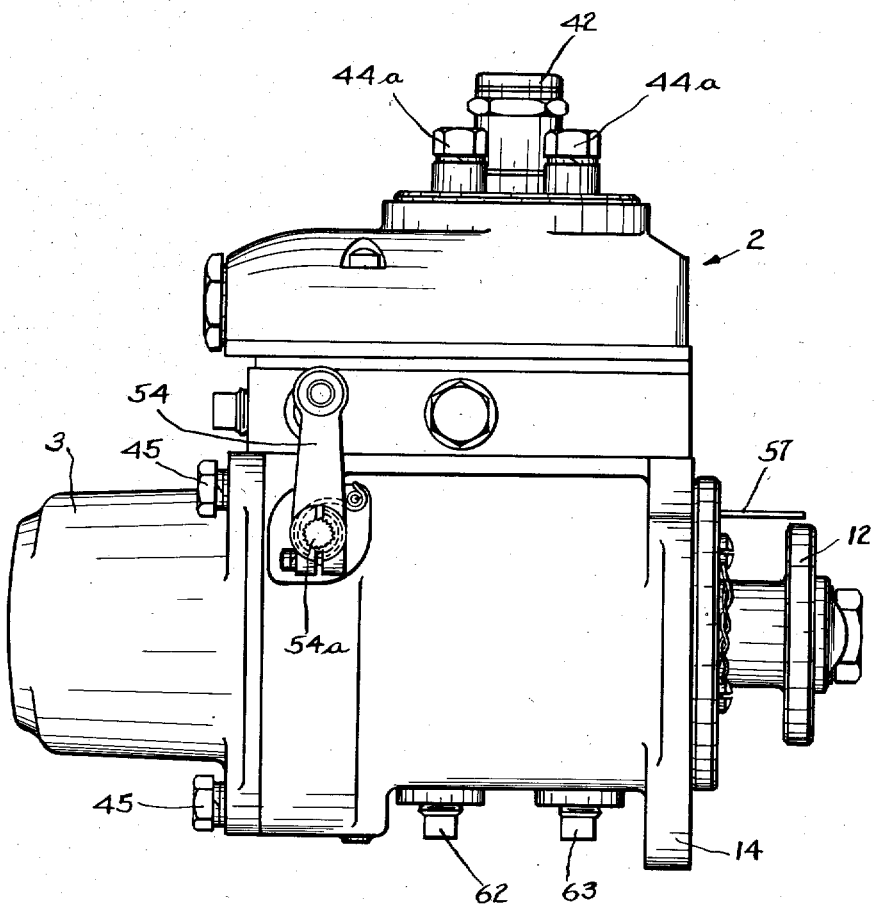
Fig. 2 is a side view thereof.
Figure 3:
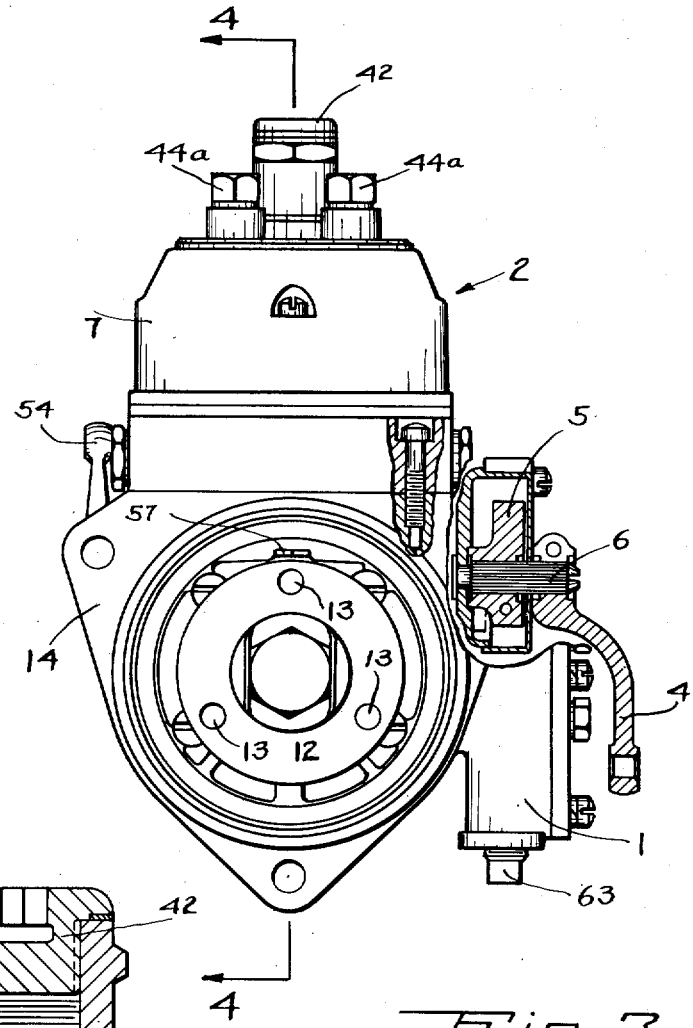
Fig. 3 is an end view thereof.
Figure 7:
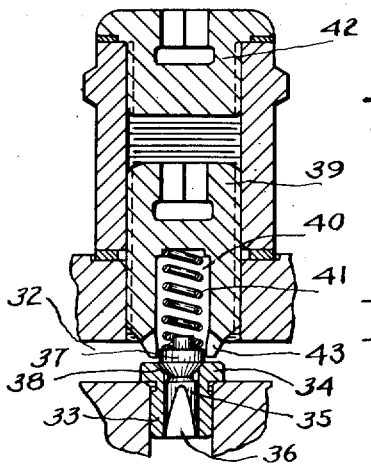
Fig. 7 is a fragmentary sectional view, on an enlarged scale, of the discharge valve.
Figure 4:
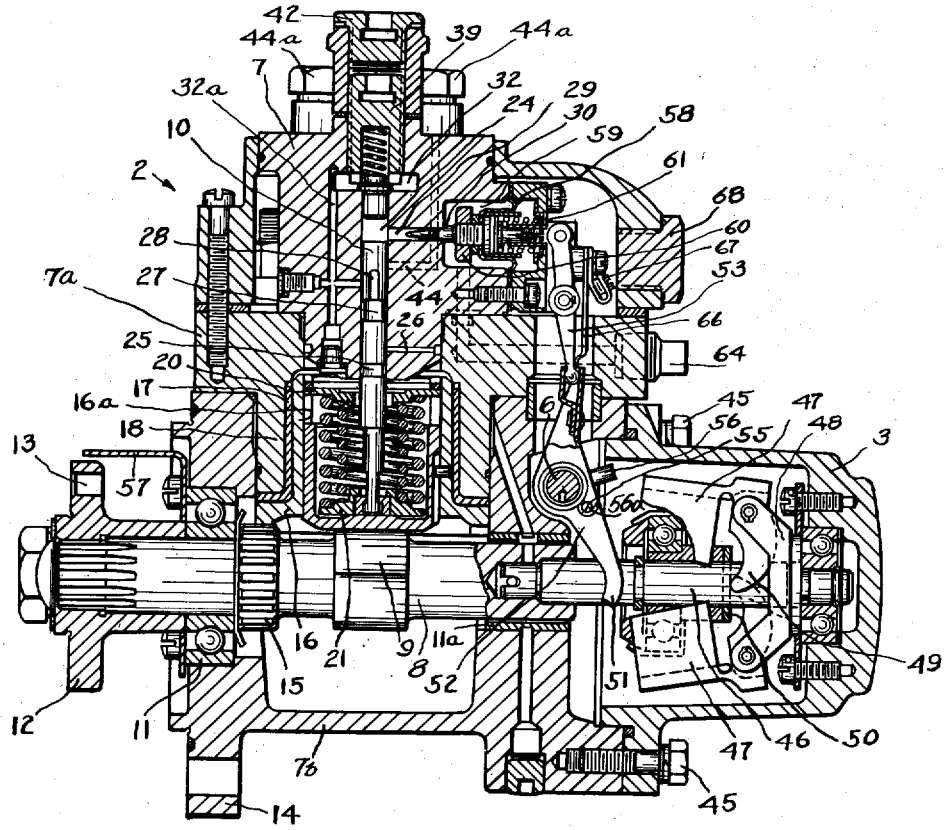
Fig. 4 is a sectional view taken on line 4—4 of Fig. 3 looking in the direction of the arrows.

For the purpose of illustrating the invention only, it has been shown applied to a unit adapted to supply fuel to a four cylinder engine operating on a four stroke cycle, but it is capable of being adapted to units for operating engines having other than four cylinders, for example, two or six cylinders.

Referring more particularly to the drawings, wherein similar reference characters designate corresponding parts throughout the several views, the device shown embodying the invention comprises the fuel supply pump 1, the fuel injection pump 2 and the governor 3 secured together to form a single relatively small compact unit which may be mounted on or removed from an engine as a single unit.

The fuel supply pump 1 has been shown by way of illustration as a conventional gear type pump including the gears 1a and 1b and the flow from the supply pump is controlled by the throttle lever 4 and the segment 5 on the throttle shaft 6. While, as stated above, a conventional gear type pump has been shown by way of illustration, it will be understood that other prior art types of fuel supply pumps capable of being mounted into a compact unit with the fuel injection pump 2 and the governor 3 may be employed, or, if desired, the fuel supply pump may be formed as a separate member having a fuel supply line connected to the fuel injection pump for supplying fuel thereto. The fuel supply pump 1 is adapted to receive fuel from the fuel supply tank through a line, not shown, which connects the fuel supply tank with fuel inlet 62 and fuel from the supply pump 1 passes through outlet 63 through a line, not shown, to the fuel inlet 64 for the fuel injection pump, through which it passes to the fuel inlet supply chamber 59.

The fuel injection pump 2 is composed of the pump head 7, main pump housing 7b and gear housing 7a, which are secured in assembled relation by bolts or the like, or other suitable means. The pump is operated by the camshaft 8 which is provided with the two oppositely disposed cam lobes 9 which are rotatable upon rotation of the camshaft 8 and adapted to reciprocate the plunger 10, the said plunger making two complete cycles for each rotation of the camshaft 8.

The camshaft 8 is rotatably mounted adjacent its opposite ends on the ball bearing 11 and the bearing 11a in the main pump housing 7b, and is provided with the hub drive 12 adapted to be secured to the driving gear of the engine with which the device is employed by being bolted thereto by bolts extending through the openings 13 in said hub 12. The mounting flange 14 is provided for securing the pump assembly in position on the engine.

On the camshaft 8 is provided the circular gear 15 which is rotated by said camshaft 8 and which meshes with the annular face gear 16 which has the hub 16a which is rotatably mounted on the bearing 17 in the housing 18. The hub 16a of the said face gear 16 has an internal spline engaging an external spline on the tappet 19 and causing rotation of the tappet 19 upon rotation of the face gear 16 and thereby causing rotation of the plunger 10.

Within the hub 16a on the face gear 16 is positioned the tappet 19 which is in splined relation with the inner face of said gear and within which is positioned the upper spring seat 20 and the lower spring seat 21 which retains the end of the plunger 10 in engagement with the tappet 19 through the action of the concentric coil plunger return springs 22 and 23 which have their opposite ends engaging the spring seats 20 and 21.

The upper spring seat 20 is merely a stop for the springs 22 and 23 while the lower spring seat 21 engages both the tappet 19 and the end of the plunger 10 and retains the end of the plunger between the seat 21 and the tappet 19. Said lower spring seat 21 is preferably provided with a self-aligning coupling to eliminate the side thrust of the plunger 10.

The pump head 7 contains the bore 24 in which the plunger 10 is reciprocably and rotatably mounted. The reciprocation and rotation of the plunger 10 causes the plunger to pump, meter, distribute and time the fuel to the proper outlet. The plunger 10 is provided with the annular lubrication groove 25 adapted to receive lubricating oil through the oil supply opening 26 when the groove 25 passes said opening 26 upon reciprocation of the plunger 10 and said plunger 10 is also provided with the annular fuel receiving groove 27 and the distributing groove 28 which is in communication therewith, and, therefore, is adapted to receive fuel from said annular fuel receiving groove 27.

Fuel is adapted to be supplied to the bore 24 through the filling port 29 in which is positioned the adjustable throttle or restriction member 30 adapted to be adjusted to control the quantity of fuel supplied to the bore 24 as hereinafter described.

In the pump head 7 at the upper end of the bore 24 is provided the discharge or check valve arrangement 31, for controlling the discharge of fuel from the bore 24 into the supply groove 32 which, in turn, is connected to the bore 24, by the fuel passageway or port 32a, which enters the bore 24 at a point below the filling port 29 and adapted to supply fuel to the annular fuel receiving groove 27 in the plunger 10 on each delivery stroke of the plunger 10.

Figure 6:
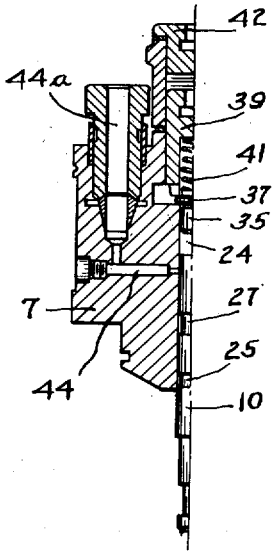
Fig. 6 is a fragmentary sectional view taken on line 6—6 of Fig. 1 looking in the direction of the arrows.

The check valve arrangement 31, as shown in Fig. 6, comprises the cylindrical member 33 positioned in the bore 24 and having the flanged head 34 seated on the pump head 7 surrounding said bore 24, and the delivery valve member 35 having opposed flattened surfaces 36 only one of which is shown, and having the enlarged head 37 which has a tapered seat 38 adapted to engage an annular tapered seat in the flanged head 34 of the cylindrical member 33 to normally prevent the flow of fuel through the discharge valve. It will be noted that the cylindrical member 33 might be omitted in which case the head 31 would seat directly on the pump head 7. The flattened opposed surfaces 36 on the opposite sides of the member 35 are preferably so formed as to control the time of the beginning of flow of fuel through the discharge valve and also the rate of flow therethrough.

If desired, and for particular purposes, the surface of the member 35 may be formed of other suitable contours than the flattened surfaces 36 described, for example, such a surface might be formed with longitudinal flutes, straight or tapered.

Above the cylindrical member 33 is positioned a speed-delivery adjusting member 39 which is threaded into the pump housing in alignment with the bore 24 and delivery valve member 35 for vertical adjustment for controlling the quantity of fuel to be delivered. The speed-delivery adjusting member 39 has a central bore 40 in aligned relation with the enlarged head 37 on the member 35 and within said central bore 40 is positioned a coil spring 41 adapted to rest at one end against the inner edge of the bore 40 in the member 39 and to have its opposite end engaging said enlarged head 37. This spring 41 is provided for effecting return of the head 37 of the valve member against its seat when the fluid flow pressure drops and also returns the member 34 against its seat on the head 7. Over the adjusting member 39 is provided the threaded plug 42 for closing the opening in the housing and which may be removed for adjusting the member 39. The lower end of the adjusting member 39 is provided with slots or openings 43 to allow fuel to pass into the supply groove 32 and from said supply groove the fuel passes through the port 32a connecting the fuel supply to the annular fuel receiving groove 27 in the plunger 10 as previously described.

It is pointed out that with the form of delivery valve employed, as described above, that as the speed at which the pump operates increases, the time for flow through the delivery valve decreases, and also that it is the tendency of the valve member 37 to be raised higher, that is, the valve opens wider with higher operating speeds.

A very desirable feature of the present construction is its tendency to reduce delivery per stroke at high speeds, that is, it provides a natural decline in quantity of fuel delivered per stroke as the speed of operation of the engine per stroke increases, and since the engine gets a smaller charge of air per stroke at higher engine speeds, the pump tends to maintain the correct air fuel ratio over the engine speed range.

In the pump housing 7 and surrounding the bore 24 and connected thereto are a series of outlet ports 44, each of which is in communication with a separate distributing outlet 44a, each of which is connected by a pipe line, not shown, to a different cylinder of the engine to which fuel is to be supplied.

The outlet ports 44 are preferably in the same longitudinal plane, although this is not necessary, but radially spaced around the bore 24 so that the distributing groove 28 on the plunger 10 will communicate with one of said outlet ports during each stroke of the plunger and due to the rotation of the plunger 10, said groove 28 will communicate with each of said ports 44 successively during successive strokes of the plunger 10.

The throttle or restriction member 30 in the fill port or fuel inlet 29 extends through the diaphragm member 58 which allows motion of the throttle member 30 and also provides a seal for the fuel inlet supply 59. The throttle member 30 extends through an opening in the diaphragm 58 and is locked in position therewith by the locking nut 60 or other suitable means.

The balancing or neutralizing spring 61 is provided to partially balance or offset the effect of the supply fuel pressure in the inlet supply 59 against the diaphragm member 58.

Outlet 64a is the outlet for the overflow return 64b to the fuel supply tank and is adapted to be connected to the tank by a supply line.

The relief valve 65, which is connected to said return 64b between the outlet 64a and the chamber 59, is provided for controlling the fuel supply pressure.

The setting of the throttle or restriction member 30 is automatically accomplished by the governor 3 as hereinafter described.

The governor 3 is secured to the fuel injection pump housing by means of the bolts 45 or other suitable means and the governor shaft 46 is keyed to the adjacent end of the camshaft 8 whereby the governor shaft and governor is driven simultaneously with and at the same speed as the camshaft 8. On the governor shaft 46 and rotatable therewith is the support 48 on which are mounted the pivotally mounted centrifugal governor weights 47, each of which has a finger 49 adapted to engage the adjustable collar 50 which is slidably mounted on the governor shaft 46, and said collar 50, in turn, abuts the forked end 51 on the pivoted lever 52 which has its opposite end operatively connected by a resilient connection to the adjacent end of another pivoted lever 53 which has its opposite end connected to the throttle member 30 for controlling the supply of fuel to the bore 24.

A manually operated lever 4, exterior of the pump housing, is connected to shaft 6 which is connected to the opposite ends of the coil spring 55 which is also connected adjacent its center to the forked end 51 of lever 52 for controlling the amount of pressure upon the pivoted lever 52 and tension of the spring 55 and the shut off lever 54 on shaft 54a operates the lug 56 on shaft 54a which is adapted to engage pin 56a on forked end 51 for pivoting of the forked end 51 of the pivoted lever 52 for closing the supply of fuel to the bore 24.

With the construction described above, rotation of the governor shaft 46 will cause pivotal movement of the centrifugal weights 47 which will impart axial movement of the collar member 50 against the forked end 51 of the pivoted lever 52 and thereby cause adjustment of pivoted lever 53 which will adjust the setting of the throttle member 30 and thereby automatically control the amount of fuel supplied to the bore 24 of the pump. By control of the tension on the spring 55, the setting of the governor may be effected.

The low idle adjustment, that is, the control of the throttle member 30 at low speeds is effected through the leaf spring 66 which bears against the lower end of the pivoted lever 53. The adjusting screw 67, which may be reached for adjustment by removal of the threaded plug 68, adjusts the tension of said leaf spring 66 on said lever 53 and thereby controls the position of the throttle 30 in conjunction with the governor 3.

On the pump housing is provided the pointer 57 by means of which the pump is timed in the following manner: After the pump is assembled, the hub 12 is rotated until the plunger 10 is in position to close the inlet port and the distributing groove is aligned with number one outlet, and the hub is then marked in line with the pointer 57. This allows the mounting of the pump on the engine with the pump in proper phased relation with the crankshaft.

In the operation of the device the fuel supply pump receives fuel through the inlet 62 and supplies fuel to the fuel injection pump 2 through the inlet 64 and inlet supply 59 to the filling port 29 and then to the bore 24.

On the descending stroke of the plunger 10, the delivery valve closes and the plunger creates a partial vacuum and uncovers the inlet or filling port 29 which tends to fill the bore 24 due to the pressure drop created in the bore and the pressure supply of fuel.

The amount of fuel supplied to the bore 24 is controlled by means of the throttle member 30 which, in turn, is controlled by the governor 3 as previously described. On its pumping stroke, the plunger 10 closes the inlet port 29 and forces the fuel in the bore 24 through the discharge valve member 31, opening 32 and port 32a to the annular fuel receiving groove 27 in the plunger from which the fuel flows to the distributing groove 28 which is aligned on successive pumping strokes with each of the ports 44 and supplies fuel to each of said ports 44 and discharge outlets 44a to the engine cylinders successively upon alignment of said distributing groove with each of said outlets successively upon successive strokes of said plunger 10.

With the delivery valve as described above having the flattened surfaces on opposite sides of the stem, the valve controls both the time of the start of flow and the rate of flow. As pointed out above, as the speed of the pump increases, the time allowed for flow by the delivery valve shortens and as it is the tendency of the valve to open higher or wider with higher pump speeds.

It will be seen that because the same delivery valve, distributing groove and metering means are employed in all cases that the amount of fuel supplied to each of the outlets is precisely the same, thus overcoming one of the most serious difficulties present in prior art constructions as pointed out above.

It is also pointed out that instead of the arrangement shown with the external bore 32a, the device could be constructed by forming a hollow plunger having a single discharge delivery valve and with the plunger having a port adapted to connect the discharge delivery valve and the fuel distributing means which would distribute the fuel to the various outlets 44 as described above.

With this type of construction the pump could be adapted for manifold-type gasoline injection since this only requires low peak injection pressures having a value of approximately one-tenth of that employed in Diesel engines of the general type to which the fuel injection pump of this application is directed. Because of the low injection pressures, such construction would not be subject to the difficulties previously set forth with injection pumps wherein the pumping plunger has an axial bore which is subject to high pressure.

From the foregoing, it will be seen that we have provided simple, efficient and economical means for obtaining all of the objects and advantages of the invention.

Having described our invention, we claim:

1. In a fuel injection pump, a combined pumping and distributing element to supply fuel to each of a plurality of engine cylinders, *means for reciprocating said element to pump fuel and rotating said element to distribute such fuel,* and a discharge check valve positioned in the fuel path between the pumping and distributing portions of said element.

2. In a fuel injection pump, a single combined pumping member and distributing member adapted to supply fuel to a plurality of engine cylinders successively, *means for reciprocating said element to pump fuel and rotating said element to distribute such fuel,* and a discharge check valve positioned in the path of fuel flow between the pumping and distributing portions of said member.

3. In a fuel injection pump, a bore, a combined pumping and distributing member in said bore, a plurality of outlets connected to said bore for supplying fuel to the various cylinders of an internal combustion engine successively, a fuel path externally of said bore and connecting the pumping and distributing portions of said member, and a single discharge check valve between the pumping portion of said member and said outlets and adapted to serve said plurality of outlets.

4. In a fuel injection pump having a bore, a pumping member in said bore and a plurality of outlets connected to said bore and adapted to connect said pumping member with the various cylinders of an internal combustion engine to supply fuel thereto, a single metering device and a single distributing means on said pumping member adapted to provide precise equal distribution of fuel to each of said outlets successively and a fuel passageway externally of said bore for delivering fuel from the portion of said bore in which it is pumped to said distributing means.

5. In a fuel injection pump having a bore, a pumping member in said bore and a plurality of outlets connected to said bore and adapted to be connected with the various cylinders of an internal combustion engine to supply fuel thereto, a single metering device and a single distributing means on said pumping member adapted to provide precise equal distribution of fuel to each of said outlets successively and a single discharge delivery valve, said valve being positioned in the path of fuel flow between the pumping and distributing portions of said pumping member.

6. In a fuel injection pump, a bore, a single combined pumping and distributing element in said bore, a plurality of outlets connected to said bore adjacent said pumping element for supplying fuel to the various cylinders of an internal combustion engine, a single distributing means on said pumping element adapted to register with said outlets successively to deliver precisely equal fuel charges to each outlet successively, and means externally of the bore for connecting said distributing means to the supply of fuel pumped by said pumping element.

7. In a fuel injection pump, a bore, a single pumping and distributing element in said bore, *means for reciprocating said element to pump fuel and rotating said element to distribute such fuel,* a plurality of outlets connected to said bore adjacent said pumping element, each of said outlets being adapted to be connected to a cylinder of an internal combustion engine whereby fuel may be supplied to said cylinders successively, a single distributing means on said pumping element adapted to register with each of said outlets successively and a single discharge valve in the path of fuel flow between the supply of fuel pumped by said pumping element and said distributing means.

8. In a fuel injection pump for internal combustion engines, a camshaft adapted to be rotated at engine crankshaft speed, a bore, a solid plunger in said bore and adapted to be reciprocated by said camshaft, said plunger having pumping and distributing portions, cam means on said camshaft for effecting a plurality of strokes of said plunger for each rotation of said camshaft, and a single discharge check valve positioned in the path of fuel flow between the pumping and *distributing portions of said plunger.*

9. In a fuel injection pump, a camshaft adapted to be rotated at crankshaft speed, a bore, a single plunger in said bore and adapted to be reciprocated by said camshaft, said plunger having integral pumping and distributing portions, cam means on said camshaft for effecting a plurality of strokes of said plunger for each rotation of said camshaft, a distributing member integral with said plunger and adapted to supply fuel to a plurality of engine cylinders, a single metering device adapted to provide equal charges of fuel to each of the engine cylinders and a single discharge check valve positioned in the path of fuel flow between said pumping and said distributing portions of said plunger.

10. In a fuel injection pump, a bore, a solid pumping and distributing member in said bore, a plurality of outlets therefrom, means for supplying fuel to said pumping member, distributor means integral with said pumping member for distributing fuel to said outlets and port means exterior of said bore for allowing the passage of fuel pumped by said pumping member to said distributor means.

11. A fuel injection apparatus wherein a single pumping member is adapted to supply fuel to a plurality of combustion chambers successively comprising a bore, a pumping and distributing member in said bore, a plurality of outlets connected to said bore, fuel distributing means integral with said pumping member, a discharge delivery valve communicating with said bore, a port external of said bore and connecting said discharge delivery valve and said fuel distributing means, a camshaft and means on said camshaft for simultaneously causing reciprocation and rotation of said pumping member to thereby effect pumping and distribution of fuel.

12. A fuel injection apparatus wherein a single pumping member is adapted to supply fuel to a plurality of combustion chambers successively comprising, a bore, a pumping and distributing member in said bore, a plurality of outlets connected to said bore, fuel distributing means integral with said pumping member, a discharge delivery valve communicating with said bore, a port external of said bore and adapted to connect said discharge delivery valve and said fuel distributing means, a camshaft, means on said camshaft for simultaneously causing reciprocation and rotation of said pumping member to thereby effect pumping and distribution of fuel, and a single fuel supply means for supplying fuel to said bore.

13. A fuel injection apparatus wherein a single pumping member is adapted to supply fuel to a plurality of combustion chambers successively comprising, a bore, a pumping and distributing member in said bore, a plurality of outlets connected to said bore, fuel distributing means integral with said pumping member, a discharge delivery valve communicating with said bore, a port external of said bore and adapted to connect said discharge delivery valve and said fuel distributing means, a camshaft, means on said camshaft for simultaneously causing reciprocation and rotation of said pumping member to thereby effect pumping and distribution of fuel, a single fuel supply means for supplying fuel to said bore and an adjustable throttle associated with said fuel supply means.

14. A fuel injection apparatus wherein a single pumping member is adapted to supply fuel to a plurality of combustion chambers successively comprising, a bore, a pumping and distributing member in said bore, a plurality of outlets connected to said bore, fuel distributing means integral with said pumping member, a discharge delivery valve communicating with said bore, a port external of said bore and connecting said discharge delivery valve and said fuel distributing means, a camshaft, means on said camshaft for simultaneously causing reciprocation and rotation of said pumping member to thereby effect pumping and distribution of fuel, a single fuel supply means for supplying fuel to said bore, an adjustable throttle associated with said fuel supply means and a governor for automatically controlling said throttle.

15. In a fuel injection pump, a housing, a bore in said housing, a solid plunger in said bore and adapted for reciprocation and rotation therein and serving both as pumping element and distributing element, a fuel passageway from the portion of said bore in which fuel is pumped under pressure to the portion thereof in which fuel is distributed and a check valve in the fuel path between said pumping and distributing portions.

16. In a fuel injection pump, a housing, a bore in said housing, a solid plunger in said bore and adapted for reciprocation and rotation therein and serving as pumping element and having means on its outer surface for serving as distributing element, a fuel passageway from the portion of said bore in which fuel is pumped under pressure to the portion thereof in which fuel is distributed and a check valve in the fuel path between said pumping and distributing portions.

17. In a fuel injection pump, a housing, a single solid pumping and distributing member in said housing, a fuel passageway for directing fuel from the pumping portion of said member to the distributing portion thereof and a discharge check valve in the fuel path between said pumping and distributing portions.

18. In a fuel injection pump, a housing, a bore in said housing, a fuel supply port communicating with said bore, a plurality of fuel outlets communicating with said bore and in spaced relation with each other, a solid pumping and distributing member in said bore and adapted to be reciprocated for pumping fuel under pressure and rotated for distributing fuel to said outlets and having means on its periphery for distributing said fuel and a fuel passageway for directing fuel pumped by said pumping and distributing member from the pumping to the distributing portions thereof and a discharge check valve positioned in the fuel path between said pumping and distributing portions.

19. In a fuel injection pump, a housing, a single, solid pumping and distributing member in said housing, a fuel passageway externally of said bore for directing fuel from the pumping portion of said member to the distributing portion thereof and a plurality of outlets adapted to communicate with said distributing portion.

20. In a fuel injection pump, a bore, means for supplying fuel to said bore, spaced outlets adapted to direct fuel from said bore to a plurality of combustion chambers, a combined pumping and distributing element in said bore, said element having a pumping portion and a distributing portion, means for directing fuel pumped by said pumping portion to said distributing portion, a discharge check valve in said means for directing fuel, said distributing portion including distributing means adapted to register with each of said outlets successively and means for supplying fuel to said distributing means.

21. In a device of the character described, a housing, a bore in said housing, a plunger in said bore, said plunger having pumping and distributing portions, a plurality of outlets communicating with said bore, a fuel passageway externally of said bore for directing fuel from the pumping portion of said plunger to the distributing portion thereof, said distributing portion including distributing means adapted to register with each of said outlets successively to direct fuel to said outlets in desired sequence and means communicating with said distributing means and with said fuel passageway and adapted to register with said fuel passageway for supplying fuel from said passageway to said distributing means.

22. In a device of the character described, a housing, a bore in said housing, a plunger in said bore, said plunger having pumping and distributing portions, a plurality of outlets communicating with said bore, a fuel passageway externally of said bore for directing fuel from the pumping portion of said plunger to the distributing portion thereof, said distributing portion including distributing means adapted to register with each of said outlets successively to direct fuel to said outlets in desired sequence and means communicating with said distributing means and adapted to register with said fuel passageway for supplying fuel from said passageway to said distributing means.

23. In a device of the character described, a housing, a bore in said housing, a plunger in said bore, said plunger having pumping and distributing portions, a plurality of outlets communicating with said bore, a fuel passageway for directing fuel from the pumping portion of said plunger to the distributing portion thereof, said distributing portion including distributing means adapted to register with each of said outlets successively to direct fuel to said outlets in desired sequence and means communicating with said distributing means and adapted to register with said fuel passageway for supplying fuel from said passageway to said distributing means, and a discharge check valve in the fuel path between the pumping and distributing portions of said plunger.

24. In a device of the character described, a housing, a bore in said housing, a plunger in said bore, said plunger having pumping and distributing portions, a plurality of outlets communicating with said bore, a fuel passageway externally of said bore for directing fuel from the pumping portion of said plunger to the distributing portion thereof, said distributing portion including distributing means adapted to register with each of said outlets successively to direct fuel to said outlets in desired sequence and means communicating with said distributing means and adapted to register with said fuel passageway for supplying fuel from said passageway to said distributing means, and a discharge check valve in the fuel path between the pumping and distributing portions of said plunger.

MARTIN J. BERLYN.
JOHN J. BRODERICK.

REFERENCES CITED

The following references are of record in the file of this patent or original patent:

UNITED STATES PATENTS

| Number | Name | Date |
|---|---|---|
| 1,292,981 | Weiss | Jan. 28, 1919 |
| 1,410,360 | Bjorkgren | Mar. 21, 1922 |
| 1,791,600 | Onions | Feb. 10, 1931 |
| 1,951,340 | Bohuslav | Mar. 20, 1934 |
| 2,101,064 | Hautzenroeder | Dec. 7, 1937 |
| 2,222,919 | Trapp | Nov. 26, 1940 |
| 2,243,861 | Hautzenroeder | June 3, 1941 |
| 2,392,501 | Pool | Jan. 8, 1946 |